United States Patent [19]
D'hoore et al.

[11] Patent Number: 6,085,160
[45] Date of Patent: Jul. 4, 2000

[54] LANGUAGE INDEPENDENT SPEECH RECOGNITION

[75] Inventors: Bart D'hoore, Aalter; Dirk Van Compernolle, Korbeek-Dijle, both of Belgium

[73] Assignee: Lernout & Hauspie Speech Products N.V., Ieper, Belgium

[21] Appl. No.: 09/113,589

[22] Filed: Jul. 10, 1998

[51] Int. Cl.[7] .................................................. G10L 5/04
[52] U.S. Cl. ............................. 704/256; 704/2; 704/277
[58] Field of Search .................................. 704/251, 254, 704/255, 243, 256, 2, 277

[56] References Cited

U.S. PATENT DOCUMENTS

| | | | |
|---|---|---|---|
| 5,540,589 | 7/1996 | Waters | 704/246 |
| 5,717,743 | 2/1998 | McMahan et al. | 704/244 |
| 5,758,023 | 5/1998 | Bordeaux | 704/232 |
| 5,768,603 | 6/1998 | Brown et al. | 704/232 |
| 5,882,202 | 3/1999 | Sameth et al. | 704/8 |
| 5,915,001 | 6/1999 | Uppaluru | 379/88.22 |
| 5,963,892 | 10/1999 | Tanka et al. | 704/2 |
| 5,963,903 | 10/1999 | Hon et al. | 704/254 |

FOREIGN PATENT DOCUMENTS

| | | |
|---|---|---|
| DE 196 34 138 | 2/1998 | Germany . |
| WO 98/11534 | 3/1998 | WIPO . |

OTHER PUBLICATIONS

Bub, U. et al. "In–Service Adapation of Multilingual Hidden–Markov–Models", *Proceedings IEEE International Conference on Acoustics, Speech and Signal Processing (ICASSP '97)*, Apr. 21, 1997, pp. 1451–1454.

Constantinescu, A. et al, "On Cross–Language Experiments and Data–Driven Units for ALISP (Automatic Language Independent Speech Processing", *Proceedings IEEE Workshop on Automatic Speech Recognition and Understanding*, Dec. 14–17, 1997, pp. 606–613.

Joachim Kohler, "Multi–Lingual Phoneme Recognition Exploiting Acoustic–Phonetic Similarities of Sounds", pp. 2195–2198.

Weng, et al., "A Study of Multilingual Speech Recognition", ESCA, Eurospeech97, pp. 359–362.

Schultz, et al., "Fast Bootstrapping of LVCSR Systems With Multilingual Phoneme Sets", ESCA, Eurospeech97, pp. 371–374.

Schultz, et al., Japanese LVCSR on the Spontaneous Scheduling Task With Janus–3, ESCA, Eurospeech97, pp. 367–370.

Bonaventura, et al., "Multilingual Speech Recognition for Flexible Vocabularies", ESCA, Eurospeech97, pp. 355–358.

Jayadev Billa, et al., "Multilingual Speech Recognition: The 1996 Byblos Callhome System", ESCA Eurospeech97, pp. 363–366.

Wang, Chao, et al., "Yinhe: A Mandarin Chinese Version of the Galaxy System", ESCA, Eurospeech97, pp. 351–354.

*Primary Examiner*—David R. Hudspeth
*Assistant Examiner*—Susan Wieland
*Attorney, Agent, or Firm*—Bromberg & Sunstein LLP

[57] ABSTRACT

A speech recognition system uses language independent acoustic models derived from speech data from multiple languages to represent speech units which are concatenated into words. In addition, the input speech signal which is compared to the language independent acoustic models may be vector quantized according to a codebook which is derived from speech data from multiple languages.

26 Claims, 3 Drawing Sheets

LANGUAGE INDEPENDENT SPEECH RECOGNITION

TECHNICAL FIELD

The present invention relates to speech recognition systems.

BACKGROUND ART

Current speech recognition systems support only individual languages. If words of another language need to be recognized, acoustic models must be exchanged. For most speech recognition systems, these models are built, or trained, by extracting statistical information from a large body of recorded speech. To provide speech recognition in a given language, one typically defines a set of symbols, known as phonemes, that represent all sounds of that language. Some systems use other subword units more generally known as phoneme-like units to represent the fundamental sounds of a given language. These phoneme-like units include biphones and triphones modeled by Hidden Markov Models (HMMs), and other speech models well known within the art.

A large quantity of spoken samples are typically recorded to permit extraction of an acoustic model for each of the phonemes. Usually, a number of native speakers—i.e., people having the language as their mother tongue—are asked to record a number of utterances. A set of recordings is referred to as a speech database. The recording of such a speech database for every language one wants to support is very costly and time consuming.

SUMMARY OF THE INVENTION (As used in the following description and claims, and unless context otherwise requires, the term "language independent" in connection with a speech recognition system means a recognition capability that is independently existing in a plurality of languages that are modeled in the speech recognition system.)

In a preferred embodiment of the present invention, there is provided a language independent speech recognition system comprising a speech pre-processor, a database of acoustic models, a language model, and a speech recognizer. The speech pre-processor receives input speech and produces a speech-related signal representative of the input speech. The database of acoustic models represent each subword unit in each of a plurality of languages. The language model characterizes a vocabulary of recognizable words and a set of grammar rules, and the speech recognizer compares the speech-related signal to the acoustic models and the language model, and recognizes the input speech as a specific word sequence of at least one word.

In a further and related embodiment, the speech pre-processor comprises a feature extractor which extracts relevant speech parameters to produce the speech-related signal. The feature extractor may include a codebook created using speech data from the plurality of languages, and use vector quantization such that the speech-related signal is a sequence of feature vectors.

Alternatively, or in addition, an embodiment may create the acoustic models using speech data from the plurality of languages. The subword units may be at least one of phonemes, parts of phonemes, and sequences of phonemes. The vocabulary of recognizable words may contain words in the plurality of languages, including proper nouns, or words in a language not present in the plurality of languages, or foreign-loan words. In addition, the words in the vocabulary of recognizable words may be described by a voice print comprised of a user-trained sequence of acoustic models from the database. Such an embodiment may further include a speaker identifier which uses the voice prints to determine the identity of the speaker of the speech input.

In yet another embodiment, the speech recognizer may compare the relevant speech parameters to acoustic models which represent subword units in a first language in the plurality of languages, and then recognize the speech input as a specific word sequence of at least one word in a second language in the plurality of languages so that input speech from a non-native speaker may be recognized.

Another embodiment of the present invention includes a computer-readable digital storage medium encoded with a computer program for teaching a foreign language to a user which when loaded into a computer operates in conjunction with an embodiment of the language independent speech recognition system described.

Embodiments of the present invention may also include a method of a language independent speech recognition system using one of the systems described above.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
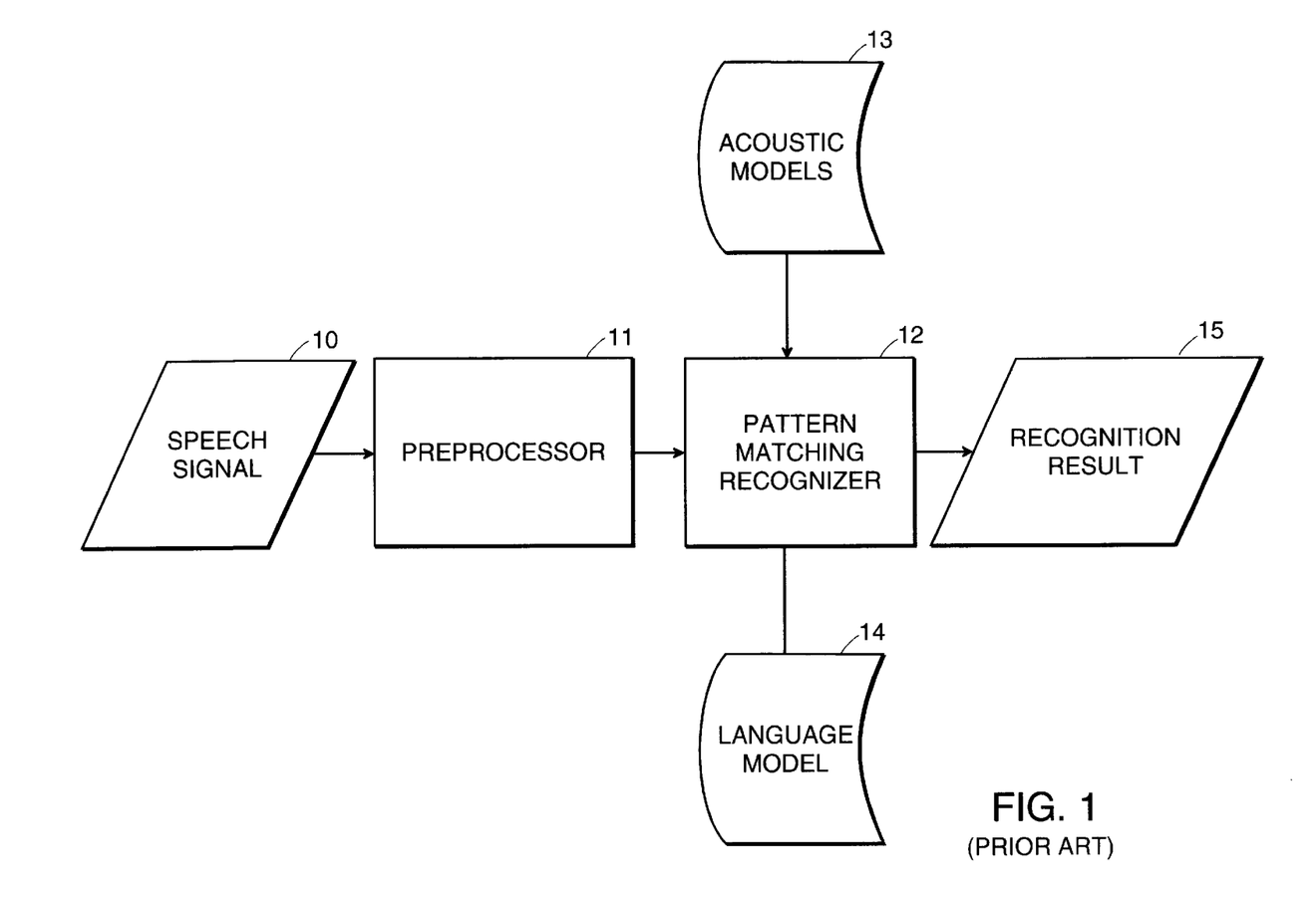
FIG. 1 illustrates the logical flow associated with a typical speech recognition system.

Operation of a typical speech recognition engine according to the prior art is illustrated in FIG. 1. A speech signal 10 is directed to a pre-processor 11, where relevant parameters are extracted from the speech signal 10. The pattern matching recognizer 12 tries to find the best word sequence recognition result 15 based on acoustic models 13 and a language model 14. The language model 14 describes words and how they connect to form a sentence. It might be as simple as a list of words in the case of an isolated word recognizer, or as complicated as a statistical language model for large vocabulary continuous speech recognition. The acoustic models 13 establish a link between the speech parameters from the pre-processor 11 and the recognition symbols that need to be recognized. In medium and large vocabulary systems, the recognition symbols are phonemes, or phoneme-like units, that are concatenated to form words. Further information on the design of a speech recognition system is provided, for example, in Rabiner and Juang, *Fundamentals of Speech Recognition* (hereinafter "Rabiner and Juang"), Prentice Hall 1993, which is hereby incorporated herein by reference.

Figure 2:
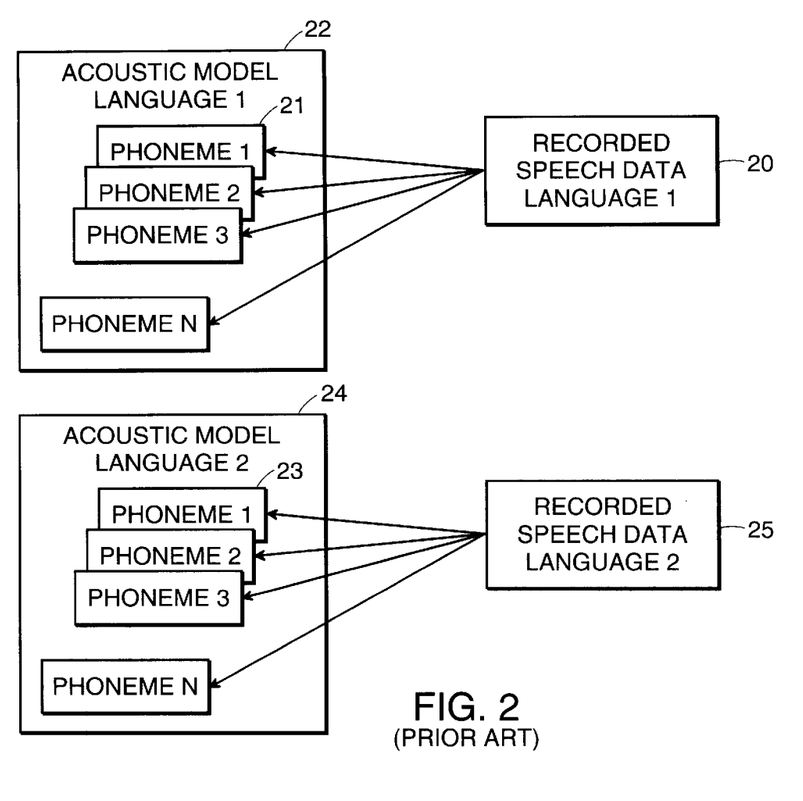
FIG. 2 illustrates acoustic models of phonemes for multiple languages according to prior art.

In a prior art system, as illustrated in FIG. 2, for any given Language 1, Language 1-specific recorded speech data 20 is used to generate acoustic models 22 which represent each phoneme 21 in the language. For any other given Language 2, Language 2-specific recorded speech data 25 is used to generate other acoustic models 24 specific to that language which represent each phoneme 23 in that Language 2.

Figure 3:
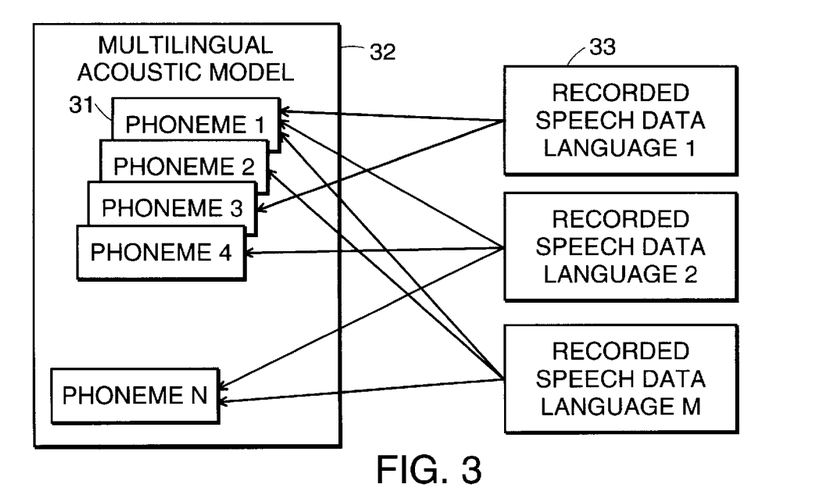
FIG. 3 illustrates multi-language acoustic models using a universal set of phonemes according to a preferred embodiment.

FIG. 3 illustrates acoustic models generated according to a preferred embodiment of the present invention. Instead of recording speech data and building acoustic models for all languages separately, as described above, a single universal set of acoustic models is used that may support all languages of the world, or a large group of languages—such as European or Oriental languages, or any plurality of languages. To accomplish this, the speech database from which the statistical information is retrieved to create the acoustic models contains the speech of several languages 33 and will cover all possible phonemes or phoneme-like units in those languages. Thus, the acoustic model of a particular phoneme is constructed based on speech from multiple languages. Accordingly, a list of universal phonemes 31 that cover all the desired languages is included in the speech recognition system, along with corresponding acoustic models 32. Since each phoneme 31 is a unique representation of a single sound, a sound that appears in several languages will be represented by the same phoneme 31 and have the same corresponding acoustic model 32. Instead of phonemes, an alternative embodiment may use phoneme-like subword units such as biphones and triphones based on Hidden Markov Models (HMMs), etc. In another embodiment, the language model 14 in FIG. 1 may be omitted and pattern matching by the recognizer 12 may be based solely on comparison of the speech parameters from the preprocessor 11 to the acoustic models 13.

Figure 4:
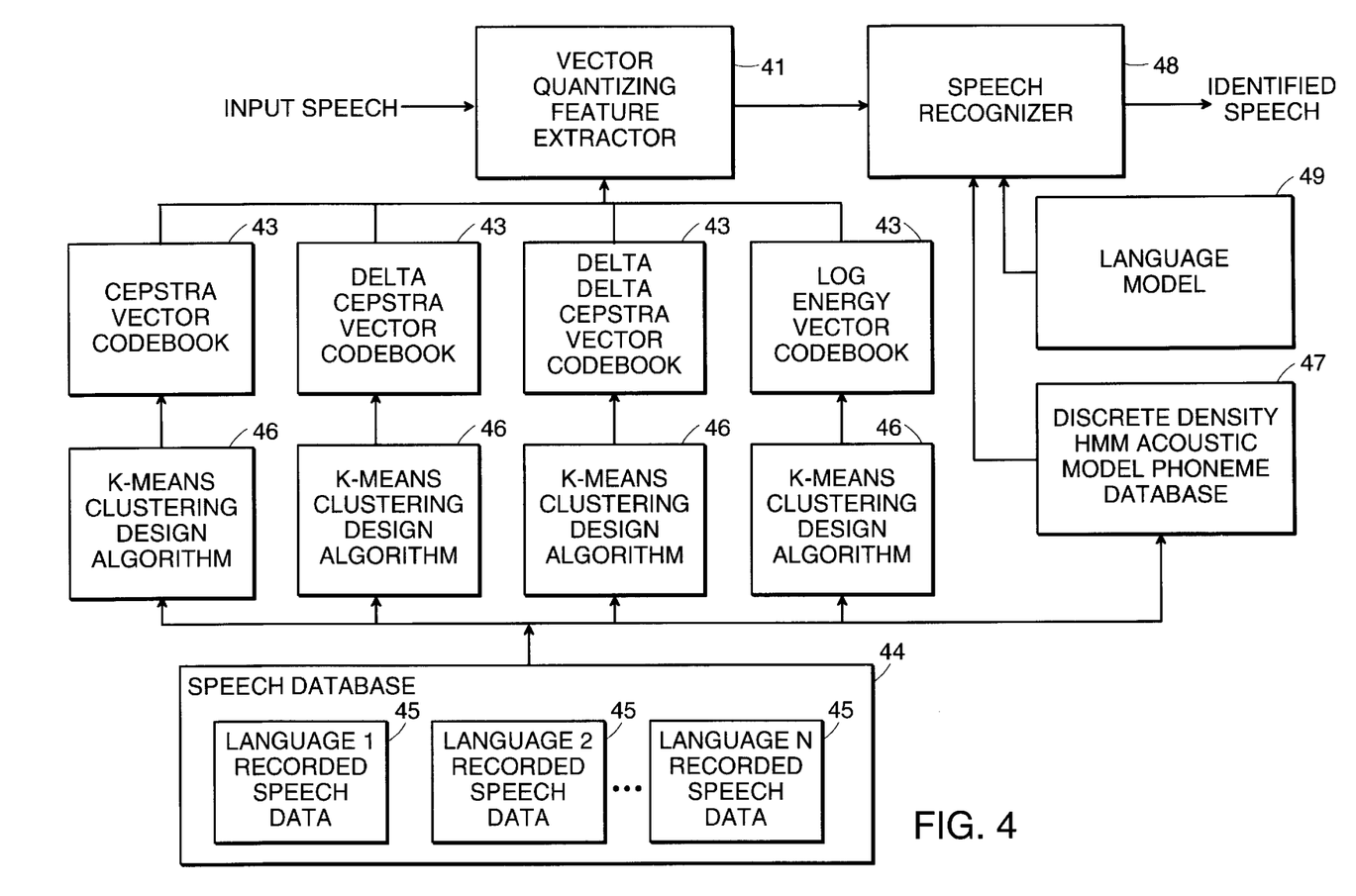
FIG. 4 illustrates a speech recognition system according to a preferred embodiment.

A speech recognition system according to a preferred embodiment is shown in FIG. 4, based on a discrete density HMM phoneme-based continuous recognition engine. These recognition engines may be useful for telephone speech, for microphone speech, or for other advantageous applications. An input speech signal initially undergoes some form of pre-processing. As shown in FIG. 4, a preferred embodiment uses a vector quantizing feature extraction module 41 which processes an input speech signal and calculates energy and spectral properties (cepstrum) for a 30 msec speech segment once every 10 msec. A preferred embodiment of a telephone speech recognition engine uses the commonly known LPC analysis method to derive 12 cepstral coefficients and log energy, along with first and second order derivatives. A preferred embodiment of a microphone speech recognition engine uses the commonly known MEL-FFT method to accomplish the same purpose. The result for both engines for each speech frame is a vector of 12 cepstra, 12 delta cepstra, 12 delta delta cepstra, delta log energy and delta delta log energy. These speech pre-processing techniques are well-known in the art. See, for example, Rabiner and Juang, supra, pp. 112–17 and 188–90, for additional discussion of this subject. The remainder of the processing is the same for both engines.

In a preferred embodiment which employs discrete density HMMs, the system employs a vector quantizing feature extraction module 41 which replaces each observed feature vector by a prototype (or codeword) out of a codebook 43 that best matches the feature vector. The codebooks 43 are designed and created using a large speech database 44 which contains recorded speech data 45 from each of a plurality of languages together with an algorithm 46 that minimizes some cost function, such as the commonly used k-means clustering method that minimizes the total distortion of the codebooks 43. Single language system codebooks according to the prior art are designed and created using speech data from the target language only. Preferred embodiments of the present invention, on the other hand, are based on multi-language models using speech from a large number of languages and selecting the speech data such that there is an equal amount of data from all languages. In such an embodiment, four codebooks 43 may be constructed: one for cepstra, one for delta cepstra, one for delta delta cepstra, and one for delta log energy and delta delta log energy. Each codebook 43 uses a design algorithm:

```
number_of_codewords: number of codewords calculated so far
target: number of codewords chosen to calculate
codebook: list of codewords
while (number_of_codewords < target) do
   split (codewords)
   update (codewords)
end
split (codewords) #splits each codeword into two new ones based on the
covariance matrix
{
foreach codeword
   eigenvector = calculateeigenvector (covariance_matrix)
   alfa = epsilon*eigenvalue
   new_codeword1 = codeword + alfa*eigenvector
   new_codeword2 = codeword − alfa*eigenvector
end
}
update (codewords) #updates codewords with mean + calculates
covariance matrix
{
until (stop_criterium) do
   #running through the speech data
   foreach vector in trainingset
      #select codeword belonging to vector
      codewordi = classify (vector, codebook)
      updatemean (codewordi, vector)
      updatecovariance (codewordi, vector)
   end
end
}
```

Although a preferred embodiment has been described as using a codebook based vector quantizing technique to initially process a speech input signal, other embodiments of the invention may employ other methods of initial speech processing, for example, such as would be used in a continuous density based speech recognition system.

Once the input speech signal has been pre-processed as previously described, such by vector quantizing, the speech recognizer, 48 in FIG. 4, compares the speech signal to acoustic models in the phoneme database 47 together with the language model 49. Instead of creating acoustic models for the phonemes (or other sub word units) of any one particular language, a preferred embodiment uses acoustic models for all the phonemes that appear in a large number of languages. A list of such universal language independent phonemes may be constructed by merging specific phoneme lists from each of the various desired languages. A preferred embodiment uses L&H+, a phonetic alphabet designed to cover all languages which represents each sound by a single symbol, and wherein each symbol represents a single sound. Table 1 shows a multi-language phoneme list used to train microphone models on British English, Dutch, American English, French, German, Italian, Spanish, and Japanese. For each phoneme, the table indicates in which language it appears. For example, the phoneme A has been trained on British English, Dutch, American English, French, and Japanese speech.

The training procedures for single language and multi-language acoustic models both use standard training techniques; they differ in the type of data that is presented and the speech units that are trained. The training can be viewed as the construction of a database of acoustic models 47 covering a specific phoneme set. The training process begins by training context independent models using Viterbi training of discrete density HMMs. Then the phoneme models are automatically classified into 14 classes. Based on the class information, context dependent phoneme models are constructed. Next, the context dependent models are trained using Viterbi training of discrete density HMMs. The context dependent and context independent phoneme models are merged, and then, lastly, badly trained context dependent models are smoothed with the context independent models. Such acoustic model training methods are well-known within the art of speech recognition. Similar training techniques may be employed in other embodiments such as for continuous density based speech recognition systems.

Prior art single language acoustic models are trained on speech from the target language. Thus an acoustic model of a given phoneme will be trained based only on speech samples from a single language. The speech recognizer engine will be able to recognize words from that language only. Separate acoustic model libraries for several languages may be constructed, but they can not easily be combined. In a discrete density based speech recognition system, it not even possible to combine them into one database since the codebooks are incompatible across languages. On the other hand, multi-language acoustic models in a preferred embodiment are trained on a speech database 44 which contains recorded speech data 45 from multiple languages. The result of the training is a database of discrete density HMM acoustic models 47 corresponding to a universal list of language independent phonemes. Some of the phoneme models will still be language specific, since they are only observed in one language. Other phoneme models will be trained on speech from more than one language.

The system describes recognizable words in its vocabulary by representing their pronunciation in speech units that are available in the acoustic model database 47. For single language acoustic model databases, this implies that only words of one language can be described, or that foreign words are simulated by describing them in speech units of that particular language. In a preferred embodiment, the multi-language acoustic model database 47 contains phoneme models that can describe words in any of the targeted languages. In either a single language or multi-language implementation, words may be added to the vocabulary of the speech recognizer system either automatically or by interaction with the user. Whether automatically or interactively, however, a preferred embodiment of a multi-language recognizer uses a vocabulary, i.e. the list of words the recognizer knows of, which can contain words of several languages. It is thus possible to recognize words of different languages. The detailed procedures for word addition differ accordingly between single language and multi-language speech recognition systems.

In a single language system, the interactive word addition mode starts with the user entering a word by typing it (e.g. "L&H"). The new word is automatically converted to a phonetic representation by a rule based system derived from the automatic text to speech conversion module or by dictionary look-up. The user can then check the transcription by listening to the output of the text to speech system that reads the phonetic transcription that it just generated (e.g. the system says "Lernout and Hauspie Speech Products"). If the user is not satisfied with the pronunciation, he can change the phonetic transcription in two ways (e.g. the user would have liked "el and eitch"). By editing the phonetic transcriptions directly, the user can listen to the changes he made by having the text to speech system play back the altered phonetic string. Alternatively, the user may enter a word that sounds like what he actually wants in a separate orthographic field (e.g. "L. and H.") and the system will convert the sound-like item into phonemes and use this as phonetic transcription for the 'real' word. Once the user is satisfied with the pronunciation of the new word, he can check it in, the transcription units are retrieved from the model database, the word is added to the recognizer and can now be recognized.

In the multi-language system of a preferred embodiment, however, the procedure for adding words interactively differs somewhat. First, as before, the user enters a new word by typing it. The system then automatically determines the language of the word via dictionary look-up and/or a rule based system and presents one or more choices to the user. For each of the chosen languages, the word is automatically converted to a phonetic representation by a rule based system derived from an automatic text to speech conversion module of that particular language. The user can check the transcriptions by listening to the output of the text to speech system that reads the phonetic transcriptions that it just generated. If the user is not satisfied with the language choice the system made, he can overrule the system and indicate explicitly one or more languages. If the user is not satisfied with the pronunciation, he can change the phonetic transcription in two ways, for each of the selected languages. The user may edit the phonetic transcriptions directly; he can listen to the changes he made by having the text to speech system play back the altered phonetic string. In this way, the user can use phoneme symbols coming from another language, but will then not necessarily be able to listen to the changes. Alternatively, the user may enter a word that sounds like what he actually wants in a separate orthographic field. The system will convert the sound-like item into phonemes and use this as phonetic transcription for the 'real' word. Once the user is satisfied with the transcriptions of the word, he can check it in. The transcription units are retrieved from the model database, the word is added to the recognizer and can now be recognized.

The automatic mode for entering words to the recognizer also differs between single language and multi-language systems. In a single language system, the application program presents the words it wants to have recognized to the speech recognition system, and the word is automatically converted to a phonetic representation by a rule based system derived from the automatic text to speech conversion module or by dictionary look-up. The transcription units then are retrieved from the model database, the word is added to the recognizer and can now be recognized. In a multi-language system of a preferred embodiment, however, the application program presents the words it wants to have recognized to the speech recognition system and optionally indicates one or more languages for the word. If the language is not indicated, the system will automatically determine the language by dictionary lookup or via a rule-based system, resulting in one or more language choices. For each language, the word is automatically converted to a phonetic representation by a rule based system derived from the automatic text to speech conversion module. The transcription units then are retrieved from the model database, the word is added to the recognizer and can now be recognized.

A multi-language system of a preferred embodiment also supports a translation mode. In such a system, one or more words are added to the recognizer for a single language following the procedures explained above. An automatic translation system then translates the words to one or more other languages that are supported by the recognizer. For each word, the system can propose one or more candidates. The automatically translated words may be added to the recognizer or edited interactively.

A preferred embodiment also enables recognition of words of a new language. Since creating acoustic models for a particular language requires the recording of a large amount of speech data, the development of a speech recognizer for a new language is costly and time consuming. The model database of the multi-language recognizer supports many more phonemes than a single language model does. Since the probability of finding a non-supported phoneme in this database is low, it becomes possible to describe a word of a language that was not present in the training data. This description will be much more accurate than the description of that word in phonemes of a single different language. To recognize words of a new language, a preferred embodiment requires only the input of the new words and their phonetic representation. No training is necessary.

Prior art speech recognition systems generally have problems recognizing speech from non-native speakers. There are two main reasons: 1) non-native speakers sometimes do not pronounce the words correctly, and 2) non-native speakers sometimes do not pronounce some sounds correctly. Multi-language models, such as in a preferred embodiment, more effectively recognize the speech of non-native speakers because the models for each of the phonemes have been trained on several languages and are more robust to variations due to accent. In addition, when creating a word vocabulary, the user can easily edit phonetic transcriptions and is allowed to use phonemes of a different language to describe foreign influences.

Some algorithms, such as speaker dependent training of words, try to find the best possible phonetic representation for a particular word based on a few utterances of that word by the user. In most cases, the native language of the user is not known. When single language models are used, the speech recognition system is restricted to mapping the speech onto language specific symbols, even though the speech may be from a completely different language. Non-native speakers may produce sounds that can not be represented well by the model database of a single language model. Preferred embodiments of the present invention avoid this type of problem since the phoneme model database covers a much wider span of sounds. A word can be added to the recognizer by having the user pronounce the word a few times. The system will automatically construct the best possible phoneme or model unit sequence to describe the word, based on the phoneme model database and the uttered speech. This sequence is referred to as a voice print. These voice prints can be used to recognize utterances of the trained word by the speaker. Since the voice print will better match the speech of the targeted speaker than the speech of another speaker, it can also be used to check or detect the identity of the speaker. This is referred to as speaker verification, or speaker identification.

A preferred embodiment is also advantageously employed for language independent recognition of words with language dependent transcriptions. The pronunciation of some words strongly depends on the native language of the speaker. This is a problem for systems in which the native language of the user either varies or is unknown. A typical example is the recognition of proper names. A Dutch name is pronounced differently by a Dutch speaker and a French speaker. Language dependent systems usually describe the foreign pronunciation variants by mapping them to the phonemes of the native language. As described above, it is possible to add a word to the speech recognition system of a preferred embodiment and indicate that it will be spoken in several languages. The system will transcribe the word with rule sets from several languages and generate several phonetic transcriptions. The recognizer uses all the transcriptions in parallel, thus covering all pronunciation variants. This is particularly useful for recognizing proper names in an application that will be used by a variety of speakers whose language is not known.

Language learning programs are computer programs that help users to learn to speak a language without intervention of a live tutor. Automatic speech recognition systems are often used in such programs to help the users test the progress they make and to help them improve the pronunciation of the language to be learned. The confidence level of the recognizer, i.e. an indication of how well a model matches the uttered speech, is an indication of how well the user pronounced a word or sentence that is represented by that model. The local confidence, which is a measure for how well the model matches a small portion of the uttered speech, a word in a sentence or a phoneme in an utterance, can give an indication on what type of error the user made and can be used to indicate specific problem areas the user should work on. Multi- language models are more suited for language learning applications than single language models. Users having Language 1 as a mother tongue, who want to learn Language 2, will make mistakes that are typical of the language couple (Language 1, Language 2). Some phonemes that appear in Language 2 do not appear in Language 1 and are thus not known to people having Language 1 as a mother tongue. They will typically replace the unknown phoneme with a phoneme that appears in Language 1, thus mispronouncing words. A typical example is a French person pronouncing an English word in English text in a French manner, because the same word also exists in French. This type of mistakes is typical of each language couple (Language 1, Language 2). A single language recognition system, be it Language 1 or Language 2 specific, cannot detect these substitutions because models to describe the particular phoneme combination are not available. Multi-language models can be used to detect this type of error since all phonemes of Language 1 and Language 2 are covered. Thus it becomes possible to create language learning systems for language couples that are enhanced with rules that describe mistakes typical to the language couple, and automatically detect specific mistakes with the help of an automatic speech recognition system.

TABLE 1

| MULTI | British | Dutch | English | French | German | Italian | Spanish | Japanese |
|-------|---------|-------|---------|--------|--------|---------|---------|----------|
| .     | +       | +     | +       | +      | +      | +       | +       | +        |
| $     | +       | +     | +       | +      | +      |         |         |          |
| ?     |         |       |         | +      | +      |         |         |          |
| @     | +       |       | +       |        |        |         |         |          |
| A     | +       | +     | +       | +      |        |         | +       |          |

TABLE 1-continued

| MULTI | British | Dutch | English | French | German | Italian | Spanish | Japanese |
|---|---|---|---|---|---|---|---|---|
| A%– |  | + |  | + |  |  |  |  |
| A&u |  | + |  |  |  |  |  |  |
| A+ | + |  |  |  |  |  |  |  |
| A: |  |  |  |  |  |  |  | + |
| B |  |  |  |  |  |  | + |  |
| C |  |  |  |  | + |  |  |  |
| D | + |  | + |  |  |  | + |  |
| E | + | + | + | + | + | + |  |  |
| E%– |  | + |  | + |  |  |  |  |
| E&$ | + |  |  |  |  |  |  |  |
| E&1 |  | + |  |  |  |  |  |  |
| E+ |  |  |  | + | + |  |  |  |
| E+%– |  |  |  | + |  |  |  |  |
| E0 | + |  | + |  |  |  |  |  |
| E0%r |  |  | + |  |  |  |  |  |
| E: |  | + |  |  |  |  |  |  |
| G |  | + |  |  |  |  | + |  |
| I | + | + | + |  | + |  |  |  |
| I&$ | + |  |  |  |  |  |  |  |
| J |  |  |  |  |  |  | + |  |
| N |  |  |  |  |  |  |  | + |
| O | + | + | + | + | + | + |  |  |
| O%– |  | + |  | + |  |  |  |  |
| O&I | + |  | + |  |  |  |  |  |
| O&y |  |  |  |  | + |  |  |  |
| P |  |  |  |  |  |  |  | + |
| R |  |  |  | + | + |  |  |  |
| R+ | + |  | + |  |  |  |  |  |
| S | + | + | + | + | + | + |  | + |
| S: |  |  |  |  |  | + |  | + |
| T | + |  | + |  |  |  | + |  |
| U | + |  | + |  | + |  |  |  |
| U&$ | + |  |  |  |  |  |  |  |
| V |  | + |  |  |  |  |  |  |
| Y |  |  |  |  | + |  |  |  |
| Z | + | + | + | + | + |  |  | + |
| ˆ | + | + | + |  |  |  |  |  |
| ˆ&y |  | + |  |  |  |  |  |  |
| a |  | + |  | + | + | + |  |  |
| a&1 | + |  | + |  |  |  |  |  |
| a&U | + |  | + |  |  |  |  |  |
| a&i |  |  |  |  | + |  |  |  |
| a&u |  |  |  |  | + | + |  |  |
| a: |  |  |  |  | + |  |  |  |
| b | + | + | + | + | + | + | + | + |
| b: |  |  |  |  |  | + |  |  |
| d | + | + | + | + | + | + | + | + |
| d&Z | + |  | + |  | + | + | + |  |
| d&z |  |  |  |  |  | + |  |  |
| d: |  |  |  |  |  | + |  |  |
| e |  | + |  | + |  | + | + | + |
| e&1 | + |  | + |  |  |  |  |  |
| e&u |  |  |  |  |  | + |  |  |
| e+ |  |  |  | + | + |  |  |  |
| e: |  |  |  |  | + |  |  | + |
| f | + | + | + | + | + | + | + |  |
| f: |  |  |  |  |  | + |  |  |
| g | + | + | + | + | + | + | + | + |
| g: |  |  |  |  |  | + |  |  |
| h | + | + | + | + |  |  | + |  |
| h\ |  |  |  | + |  |  |  |  |
| i | + | + | + | + |  | + | + | + |
| i0 |  | + |  |  |  |  |  |  |
| i: |  |  |  |  | + |  |  | + |
| j | + | + | + | + | + | + | + | + |
| k | + | + | + | + | + | + | + |  |
| k: |  |  |  |  |  | + |  | + |
| l | + | + | + | + | + | + | + |  |
| l: |  |  |  |  |  | + |  |  |
| l– |  |  |  |  |  | + |  |  |
| l–: |  |  |  |  |  | + |  |  |
| m | + | + | + | + | + | + | + | + |
| m: |  |  |  |  |  | + |  |  |
| n | + | + | + | + | + | + | + | + |
| n: |  |  |  |  |  | + |  |  |
| nK | + | + | + | + | + |  |  |  |
| n– |  | + |  | + |  |  | + |  |

TABLE 1-continued

| MULTI | British | Dutch | English | French | German | Italian | Spanish | Japanese |
|---|---|---|---|---|---|---|---|---|
| n-1 | | | | | + | | | |
| o | | + | | + | | + | + | + |
| o&U | + | | + | | | | | |
| o: | | | | | + | | + | |
| p | + | + | + | + | + | + | + | + |
| p&f | | | | | + | | | |
| p: | | | | | | + | | + |
| r | | + | | | | + | + | |
| r6 | | | | | | | + | + |
| r: | | | | | + | | | |
| s | + | + | + | + | + | + | + | + |
| s: | | | | | | + | | + |
| t | + | + | + | + | + | + | + | + |
| t&S | + | | + | | + | + | + | + |
| t&S: | | | | | | | | + |
| t&s | | | | | + | + | | + |
| t&s: | | | | | | | | + |
| t: | | | | | | + | | + |
| u | + | + | + | + | | + | + | |
| u- | | | | | | | | + |
| u-1 | | | | | | | | + |
| u; | + | + | + | + | + | + | | + |
| v | + | + | + | + | + | + | | + |
| v; | | | | | | + | | |
| w | + | + | + | + | | + | + | + |
| x | | + | | | + | | + | |
| y | | + | | + | | | | |
| y: | | | | | + | | | |
| z | + | + | + | + | + | + | | + |

What is claimed is:

1. A language independent speech recognition system comprising:
   a. a speech pre-processor which receives input speech and produces a speech-related signal representative of the input speech;
   b. a database of acoustic hidden Markov models which represent subword units in each of a plurality of languages, wherein any subword unit that is common to two or more of the plurality of languages is represented by a single common acoustic hidden Markov model;
   c. a language model which characterizes a vocabulary of recognizable words and a set of grammar rules; and
   d. a speech recognizer which compares the speech-related signal to the acoustic hidden Markov models and the language model, and recognizes the input speech as a specific word sequence of at least one word.

2. A system according to claim 1, wherein the speech pre-processor comprises a feature extractor which extracts relevant speech parameters to produce the speech-related signal.

3. A system according to claim 2, wherein the feature extractor includes a codebook created using speech data from the plurality of languages, and wherein the feature extractor uses vector quantization such that the speech-related signal is a sequence of feature vectors.

4. A system according to claim 1, wherein the acoustic hidden Markov models are created using speech data from the plurality of languages.

5. A system according to claim 1, wherein the subword units are at least one of phonemes, parts of phonemes, and sequences of phonemes.

6. A system according to claim 1, wherein the vocabulary of recognizable words contains words in the plurality of languages.

7. A system according to claim 1, wherein the vocabulary of recognizable words contains foreign-loan words.

8. A system according to claim 1, wherein the vocabulary of recognizable words contains proper names in the plurality of languages.

9. A system according to claim 1, wherein the words in the vocabulary of recognizable words are described by a voice print comprised of a user-trained sequence of acoustic hidden Markov models from the database.

10. A system according to claim 9, further comprising:
    e. a speaker identifier which uses the voice prints to determine the identity of the speaker of the speech input.

11. A system according to claim 1, wherein the vocabulary of recognizable words contains words in a language not present in the plurality of languages.

12. A system according to claim 1, wherein the speech recognizer compares the relevant speech parameters to acoustic models which represent subword units in a first language in the plurality of languages, and recognizes the speech input as a specific word sequence of at least one word in a second language in the plurality of languages so that input speech from a non-native speaker may be recognized.

13. A system according to claim 1, wherein the speech recognizer further provides an indication of how closely the input speech matches the words in the vocabulary of recognizable words, and if a specific pronunciation problem is present, assists a speaker of the input speech in correcting a pronunciation problem.

14. A method of language independent speech recognition comprising:
    a. receiving input speech with a speech pre-processor and producing a speech-related signal representative of the input speech;
    b. representing in a database of acoustic hidden Markov models, subword units in each of a plurality of languages, wherein any subword unit that is common to two or more of the plurality of languages is represented by a single common acoustic hidden Markov model;

c. characterizing in a language model a vocabulary of recognizable words and a set of grammar rules; and d. comparing in a speech recognizer the speech-related signal to the acoustic hidden Markov models and the language model, and recognizing the input speech as a specific word sequence of at least one word.

15. A method according to claim 14, wherein the step of receiving uses a speech pre-processor which further comprises a feature extractor for extracting relevant speech parameters and producing the speech-related signal.

16. A method according to claim 15, wherein the feature extractor includes a codebook created using speech data from the plurality of languages, and wherein the feature extractor uses vector quantization such that the speech-related signal is a sequence of feature vectors.

17. A method according to claim 14, wherein the acoustic hidden Markov models are created using speech data from the plurality of languages.

18. A method according to claim 14, wherein the subword units are at least one of phonemes, parts of phonemes, and sequences of phonemes.

19. A method according to claim 14, wherein the vocabulary of recognizable words contains words in the plurality of languages.

20. A method according to claim 14, wherein the vocabulary of recognizable words contains foreign-loan words.

21. A method according to claim 14, wherein the vocabulary of recognizable words contains proper names in the plurality of languages.

22. A method according to claim 14, wherein the words in the vocabulary of recognizable words are described by a voice print comprised of a user-trained sequence of acoustic hidden Markov models from the database.

23. A method according to claim 22, further comprising e. determining the identity of the speaker of the speech input with a speaker identifier which uses the voice prints.

24. A method according to claim 14, wherein the vocabulary of recognizable words contains words in a language not present in the plurality of languages.

25. A method according to claim 14, wherein the speech recognizer compares the relevant speech parameters to acoustic hidden Markov models which represent subword units in a first language in the plurality of languages, and recognizes the speech input as a specific word sequence of at least one word in a second language in the plurality of languages so that input speech from a non-native speaker may be recognized.

26. A method according to claim 14, wherein subpart (d) of the method further includes providing an indication of how closely the input speech matches the words in the vocabulary of recognizable words, and if a specific pronunciation problem is present, assists a speaker of the input speech in correcting a pronunciation problem.

* * * * *